United States Patent
Berne et al.

(10) Patent No.: US 12,043,182 B2
(45) Date of Patent: Jul. 23, 2024

(54) DISPLAY SYSTEM FOR A VEHICLE AND METHOD FOR ADJUSTING THE ORIENTATION OF DISPLAY UNITS IN A VEHICLE

(71) Applicant: Volvo Truck Corporation, Gothenburg (SE)

(72) Inventors: Nicolas Berne, Heyrieux (FR); Chris-Olivier Sagnard, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/768,010

(22) PCT Filed: Nov. 27, 2019

(86) PCT No.: PCT/EP2019/082724
§ 371 (c)(1),
(2) Date: Apr. 11, 2022

(87) PCT Pub. No.: WO2021/104617
PCT Pub. Date: Jun. 3, 2021

(65) Prior Publication Data
US 2024/0101042 A1    Mar. 28, 2024

(51) Int. Cl.
*B60R 21/015*    (2006.01)
*B60N 2/12*    (2006.01)
*B60R 1/22*    (2022.01)
*B60R 11/02*    (2006.01)
*B60R 11/00*    (2006.01)

(52) U.S. Cl.
CPC .......... *B60R 11/0229* (2013.01); *B60N 2/12* (2013.01); *B60R 1/22* (2022.01); *B60R 11/0235* (2013.01); *B60R 21/01554* (2014.10); *B60R 2011/008* (2013.01)

(58) Field of Classification Search
CPC ................................ B60R 21/01554
See application file for complete search history.

(56) References Cited

U.S. PATENT DOCUMENTS

2018/0052494 A1    2/2018    Coburn
2018/0262719 A1    9/2018    Jo

FOREIGN PATENT DOCUMENTS

| CN | 110316063 A | 10/2019 |
| DE | 102013225955 A1 | 6/2014 |
| EP | 2923884 A1 | 9/2015 |
| JP | 2016124393 A | 7/2016 |
| WO | 18234403 A1 | 12/2018 |

OTHER PUBLICATIONS

International Search Report and Written Opinion for International Patent Application No. PCT/EP2019/082724, mailed Jun. 23, 2020, 11 pages.

*Primary Examiner* — Young Lee
(74) *Attorney, Agent, or Firm* — Withrow & Terranova, PLLC

(57) ABSTRACT

A display system for a vehicle that comprises at least two display units mounted within a vehicle so as to be positioned at both sides of a driver seat. The display units are adapted to display images captured by video cameras mounted outside the vehicle, wherein the orientation of each display unit relative to the driver seat is adjustable. The vehicle also includes a controller coupled to a display orientating device and a seat position sensor device and adapted to automatically control the display orientating device based on the seat position data received from the seat position sensor device.

14 Claims, 3 Drawing Sheets

DISPLAY SYSTEM FOR A VEHICLE AND METHOD FOR ADJUSTING THE ORIENTATION OF DISPLAY UNITS IN A VEHICLE

This application is a 35 USC 371 national phase filing of International Application No. PCT/EP2019/082724, filed Nov. 27, 2019, the disclosure of which is incorporated herein by reference in its entirety.

TECHNICAL FIELD

The invention relates to a display system for a vehicle and a method for adjusting the orientation of display units in a vehicle.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment and passenger cars. The invention may also be used on other transportation means such as ships, boats and aeroplanes

BACKGROUND

An autonomous or a semi-autonomous vehicle is a vehicle capable of sensing its environment and navigating without the use of human input. Such vehicles are often capable of transitioning from an autonomous driving mode, where the vehicle has an autonomous driving functionality, and a manual driving mode, where the vehicle has a manual driving functionality in which a driver manually operates the vehicle. It is envisioned that autonomous driving only will be allowed on roads or in zones that are preapproved or certified. When driving the vehicle to such a certified road for autonomous driving, the driver will have to control the vehicle and when entering the certified road the vehicle can enter the autonomous driving mode. In the autonomous driving mode, the driver of the vehicle may engage in activities that are not related to the driving of the vehicle, such as for example resting, working or using multimedia applications. Therefore, the position of the driver seat in an autonomous vehicle may be adjusted both along a longitudinal and/or a lateral direction defined by the vehicle, and along and/or around a vertical axis.

The autonomous vehicles are typically equipped with camera monitoring systems (CMS) where video cameras replace mirrors. The images captured by said video cameras are often displayed on at least two display units mounted within the vehicle at both sides of the driver seat. These display units must be specifically positioned and orientated for giving the driver the same field of vision in any positions of the driver seat. In particular, in Europe, the use of such display units in a motor vehicle is conditioned to the respect of specific requirements defined in the Regulation UN ECE no°46.

Display systems that automatically adjust the position of a display within a vehicle are already known in the state of the art, in particular from the documents WO 18/234403 and EP 2 923 884.

The document WO 18/234403 discloses a display system configured to display image to occupant of a vehicle through a plurality of display panels. The location where the image is displayed may vary depending on the driver seat position within the vehicle. In particular, when the driver seat is a normal driving position, the image is displayed on the dashboard, whereas when the driver seat is in a rest position, the image is displayed on the headliner.

This system thus constrains the driver to move his head if he wishes to see both display panels at the same time. Thus, this system does not give the driver the same field of vision in any positions of the driver seat.

The document EP 2 923 884 discloses a display system configured to display information or image to an occupant sitting in a seat of a vehicle through a unique display. The position and/or the orientation of the display may vary depending on the current occupant position in the seat. However, this system is specifically configured to adjust the position of a display connected to the roof of the vehicle, over the head of an occupant sitting in a rear seat. It is thus not configured to adjust the position of two displays disposed at both sides of the driver seat so as to permit the occupant of the driver seat to see both displays in any positions of the driver seat.

There is thus a need in autonomous or semi-autonomous vehicles to provide an improved display system suitable for adjusting the orientation of at least two display units disposed at both sides of the driver seat in a vehicle.

SUMMARY

An object of the invention is to provide a display system for a vehicle, in which the previously mentioned problems are avoided.

According to a first aspect of the invention, the object is achieved by the display system according to the independent claim 1. The dependent claims 2 to 10 contain further developments of the display system. The display system comprises:

at least two display units mounted within a vehicle so as to be positioned at both sides of a driver seat, said display units being adapted to display images captured by video cameras mounted outside the vehicle, wherein the orientation of each display unit relative to the driver seat is adjustable;

a display orientating device adapted to control the orientation of each display unit within the vehicle;

a seat position sensor device adapted to sense in real time the position of the driver seat within the vehicle and to output corresponding seat position data;

a controller coupled to the display orientating device and to the seat position sensor device and adapted to automatically control the display orientating device based on the seat position data received from the seat position sensor device such that the orientations of the at least two display units relative to the driver seat are adjusted to permit to an occupant seated in the driver seat to see both display units at the same viewing angle in any positions of the driver seat, and, preferably, to provide to said occupant a field of vision that is in accordance with the Regulation UN ECE n° 46.

Thus configured, the system of the present invention permits to adjust the orientation of the display units so that the occupant seated in the driver seat can see both display units at the same viewing angle in any positions of the driver seat. This automatic adjustment is performed very shortly after the real time monitoring of the driver seat position so that it is almost simultaneous to the movement of the driver seat.

According to a second aspect of the invention, the object is achieved by a vehicle according to claim 12.

According to a third aspect of the invention, the object is achieved by a method according to independent claim 13. The dependent claims 14 and 15 contain further developments.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
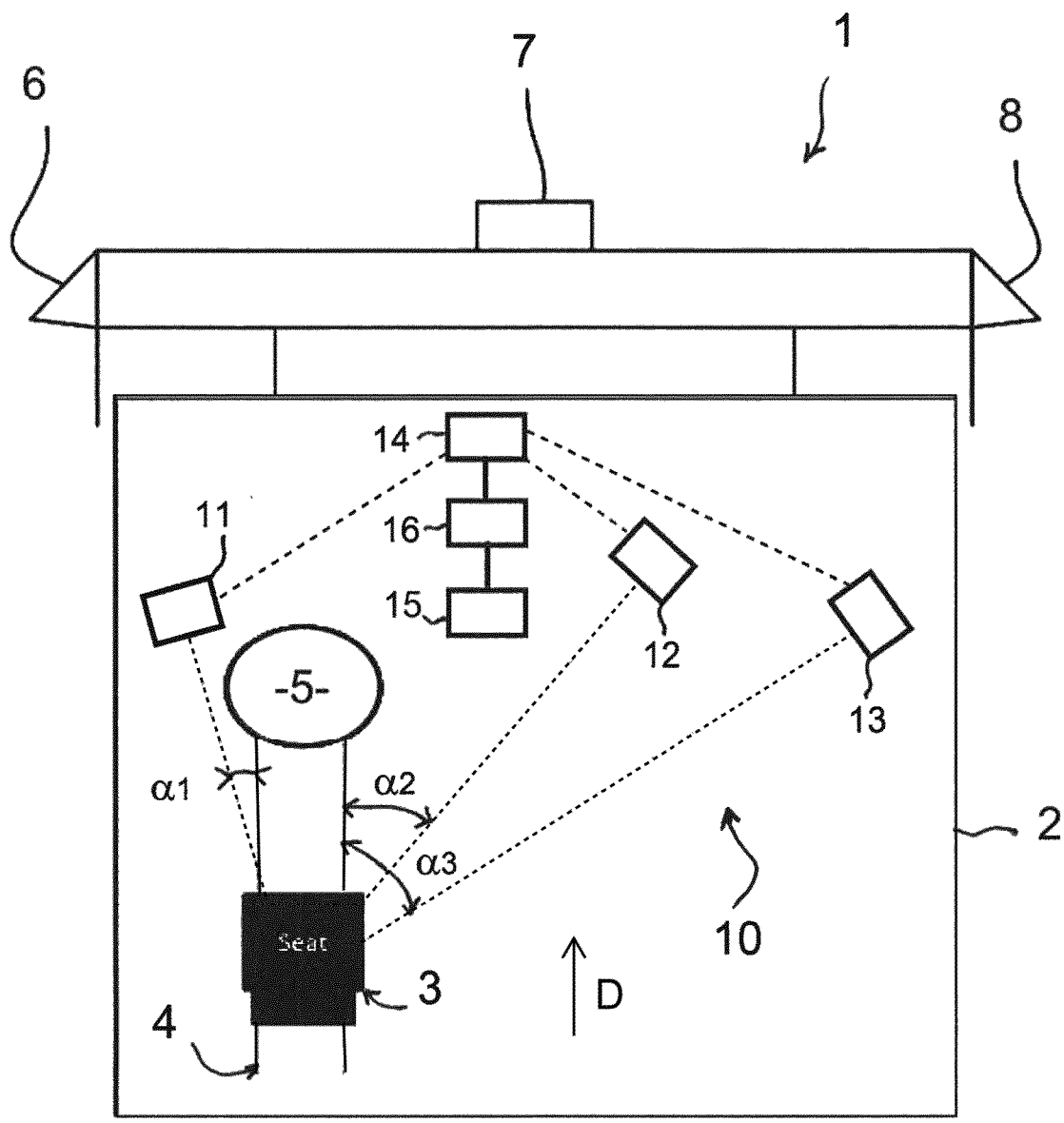
FIGS. 1, 2 and 3 are schematic top views of the cab of a vehicle equipped with a display system according to the invention, respectively in first, second and third driver seat positions.

FIG. 1 shows a vehicle 1, more specifically a truck. Although the invention will be described with respect to a truck, the invention is not restricted to this particular vehicle, but may be used in other vehicles.

The vehicle 1 comprises a cab 2 and three video cameras, respectively a left camera 6, a central camera 7 and a right camera 8, for example embedded in a sun visor mounted outside of the cab 2. The left, central and right cameras 6-8 are respectively positioned at the left, central and right part of the sun visor. These cameras are correctly positioned to capture images in surrounding areas, behind the cab 2 for the left and right cameras 6, 8 and in front of the cab 2 for the central camera 7. The images captured by the cameras 6-8 are transmitted in the form of electronic signals to a controller 16. The controller 16 is configured to convert said electronic signals in image data that can be displayed on corresponding display units, respectively a left display unit 11, a central display unit 12 and a right display unit 13, that are mounted within the cab 2 to be positioned at the left side of a driver seat 3 for the left display unit 11 and at the right side of the driver seat 3 for the central and right display units 12, 13. Each display unit 11-13 is pivotally connected to the cab 2 via a pivot point such that its orientation relative to the driver seat 3 is adjustable. This orientation may be defined, for instance, by the angle between an axis connecting each display unit 11-13 to the center of gravity of the driver seat 3 and a longitudinal direction D defined by the vehicle 1. This angle may also vary when the driver seat 3 is moving in the cab 2. In particular, the driver seat 3 may be slidably movable along rails 4 so that its position along the longitudinal direction D is adjustable. The distance between the driver seat 3 and the steering wheel 5 may thus be shortened or increased. Furthermore, the driver seat 3 may pivot around a vertical axis so that its angular position relative to the longitudinal direction D is adjustable. These adjustments are not limitative for the invention. Further adjustments of the position and/or orientation of the driver seat 3 within the vehicle 1 may be possible. In particular, in further embodiments (not shown) of the vehicle 1, the driver seat 3 may be movable along a lateral direction that is perpendicular to the longitudinal direction D or along a vertical direction.

The controller 16 and the display units 11-13 form the main components of the display system 10 according to the invention.

The display system 10 further comprises a seat position sensor device 15 that is adapted to sense in real time the current position of the driver seat 3 and to output corresponding seat position data to the controller 16. In particular, the seat position sensor device 15 is adapted to determine, for instance, one or a plurality of the following features:

the distance between the center of gravity of the driver seat 3 and a fixed point within the vehicle 1;

the distance between the center of gravity of the driver seat 3 and a horizontal and/or vertical plane within the vehicle 1;

the orientation of the driver seat 3 relative to a horizontal and/or vertical plane within the vehicle 1;

the position of the driver seat 3 along the rails 4;

the distance between the center of gravity of the driver seat 3 and a plane defined by the rails 4;

the angular position of the driver seat 3 relative to a plane perpendicular to the plane defined by the rails 4.

The seat position sensor device 15 may be chosen among a video camera, pressure sensors, electromagnetic sensors and ultrasonic sensors.

The display system 10 further comprises a display orientating device 14 that is adapted to control the orientation of each display unit 11-13 in the cab 2. The display orientating device 14 is coupled to the controller 16 and is controlled by said controller 16 based on the seat position data provided by the seat position sensor device 15. The display orientating device 14 may thus adjust the orientations of each display unit 11-13 relative to the driver seat 3 to permit to an occupant sitting in the driver seat 3 to see the three display units 11-13 at the same viewing angle in any positions of the driver seat 3. In particular, these display units 11-13 may preferably be oriented so as to provide to said occupant a field of vision that is in accordance with the Regulation UN ECE no 46.

The method for adjusting the orientation of each display unit 11-13 is detailed in the following paragraphs, in reference to the FIGS. 1 to 3.

In reference in FIG. 1, it is illustrated the orientation of the display units 11-13 of the display system 10 when the driver seat 3 is in its normal position of use. In this normal position of use, the driver seat 3 is parallel to the longitudinal direction D and is distant from the steering wheel 5 to permit to an occupant seated in the driver seat 3 to hold the steering wheel 5 in his hands with his arms slightly bent.

In a first step, the current position of the driver seat 3 is sensed by the seat position sensor device 15. The seat position sensor device 10 may thus determine seat position data corresponding to said current position of the driver seat 3.

In a second step, the determined seat position data are transmitted to the controller 16 that is coupled to the seat position sensor device 10.

In a third step, the controller 16 determines the orientations of the display units 11-13 based on said determined seat position data. The determined orientations may result from a complex calculation in which the relative positions and orientations between the display units 11-13 and the driver seat 3 are the main parameters. This complex calculation is specifically adapted to find the best orientations of the display units 11-13 that permit to an occupant seated in the driver seat 3 to see each display unit 11-13 at the same viewing angle in any positions of the driver seat 3. This third step is performed automatically by the controller 16. In the embodiment shown, the determined orientations may for example be expressed by the respective angles $\alpha 1$, $\alpha 2$ and $\alpha 3$ between an axis connecting the left, central and right display units 11-13 to the center of gravity of the driver seat 3 and the longitudinal direction D.

In a fourth step, the controller 16 controls the display orientating device 14 so that it adjusts the orientations of the display units 11-13 to the determined orientations.

Figure 2:
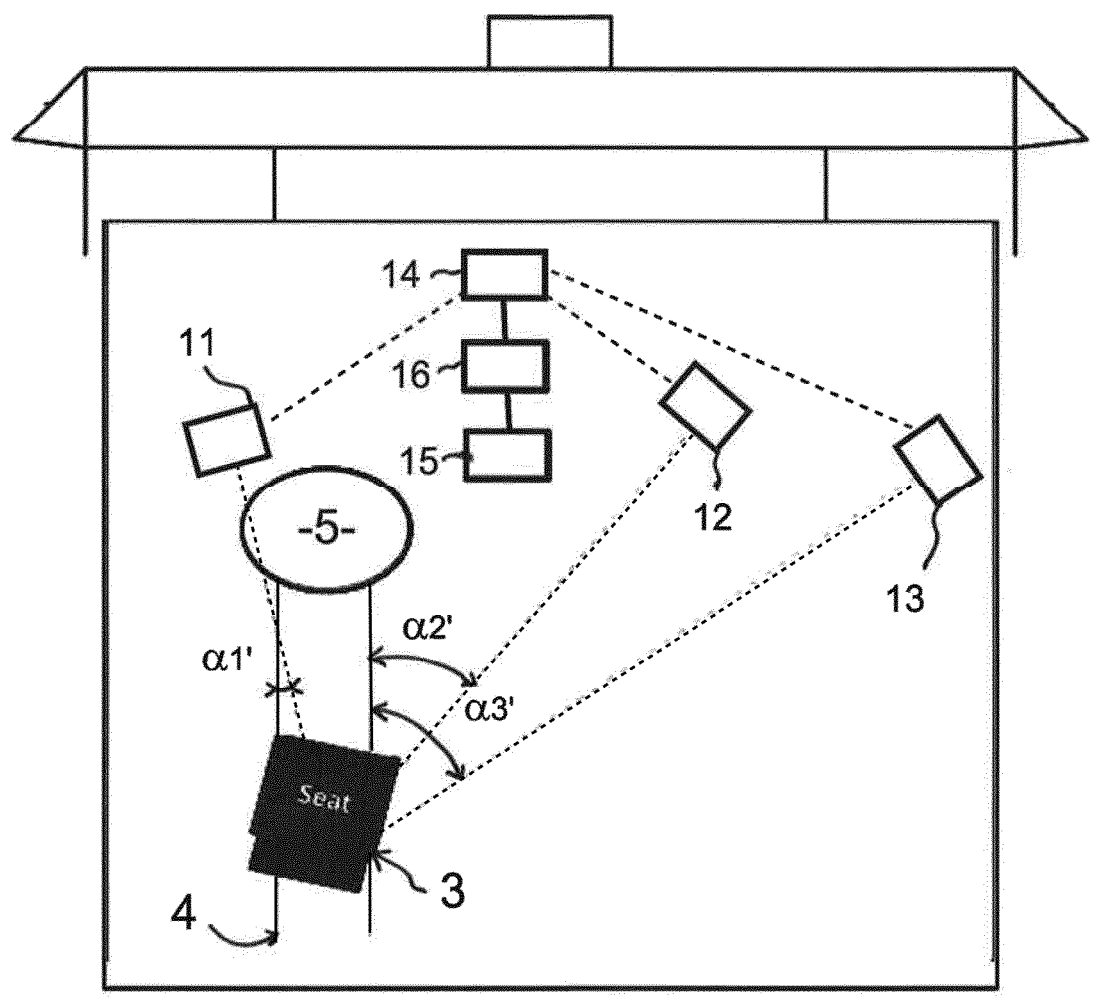

In reference to FIG. 2, it is illustrated the orientation of the display units 11-13 of the display system 10 when the driver seat 3 has been pivotally moved about a vertical axis from the normal position of use of FIG. 1. In this second position of use, the driver seat 3 is obliquely oriented relative to the longitudinal direction D.

After performing the four steps previously mentioned, the display system 10 determines the new orientations of the display units 11-13, expressed by the angles $\alpha 1'$, $\alpha 2'$ and $\alpha 3'$ in FIG. 2, and the orientations of the display units 11-13 are adjusted by the display system 10 to said new orientations.

Figure 3:
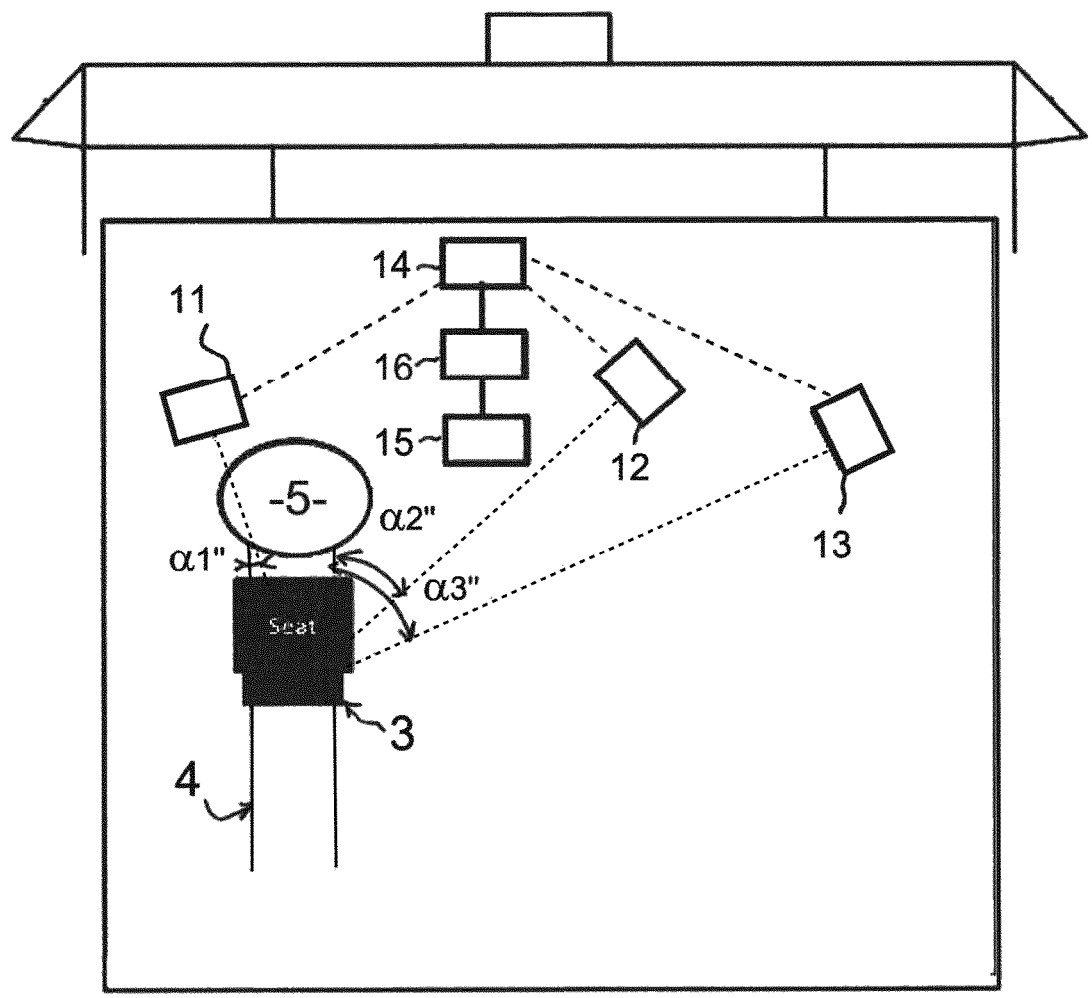

In reference to FIG. 3, it is illustrated the orientation of the display units 11-13 of the display system 10 when the driver seat 3 has been moved along the rails 4 from the normal position of use of FIG. 1 to be closer to the steering wheel 5.

After performing the four steps previously mentioned, the display system 10 determines the new orientations of the display units 11-13, expressed by the angles $\alpha 1''$, $\alpha 2''$ and $\alpha 3''$ in FIG. 3, and the orientations of the display units 11-13 are adjusted by the display system 10 to said new orientations.

The display system 10 may further comprise a memory storing reference data relative to the specific positions of use illustrated in FIGS. 1 to 3, or relative to a plurality of further reference positions of the driver seat 3. Thus, during the third step previously mentioned, the controller 16 is adapted to compare the seat position data received from the seat position sensor device 15 with said reference data and to determine if the current position of the driver seat 3 corresponds to a specific reference position stored in the memory. Therefore, when the current position of the driver seat 3 corresponds to a specific reference position stored in the memory, the complex calculation for the determination of the best orientations of the display units 11-13 may advantageously be avoided, these best orientations being already stored in the memory for each reference position of the driver seat 3. This results in a reduced execution time of the fourth step and, accordingly, of the method of the present invention.

It is to be understood that the present invention is not limited to the embodiments described above and illustrated in the drawings; rather, the skilled person will recognize that many changes and modifications may be made within the scope of the appended claims.

In particular, in further embodiments of the present invention, the display system 10 may comprise only two display units, or more than three display units.

The invention claimed is:

1. A vehicle comprising:
video cameras arranged outside the vehicle and adapted to capture images around the vehicle;
a driver seat mounted within the vehicle, the position of the driver seat within the vehicle being variable; and
a display system, comprising:
at least two display units mounted within the vehicle so as to be positioned at both sides of the driver seat, the display units being adapted to display images captured by the video cameras mounted outside the vehicle, wherein the orientation of each display unit relative to the driver seat is adjustable;
a display orientating device adapted to control the orientation of each display unit within the vehicle;
a seat position sensor device adapted to sense in real time the position of the driver seat within the vehicle and to output corresponding seat position data; and
a controller coupled to the display orientating device and to the seat position sensor device and adapted to automatically control the display orientating device based on the seat position data received from the seat position sensor device such that the orientations of the at least two display units relative to the driver seat are adjusted to permit an occupant seated in the driver seat to see both display units at the same viewing angle in any positions of the driver seat.

2. The display system of claim 1, wherein the seat position sensor device is adapted to determine the distance between a center of gravity of the driver seat and a fixed point within the vehicle.

3. The display system of claim 1, wherein the seat position sensor device is adapted to determine the distance between a center of gravity of the driver seat and a horizontal and/or a vertical plane within the vehicle.

4. The display system of claim 1, wherein the seat position sensor device is adapted to determine the orientation of the driver seat relative to a horizontal and/or a vertical plane within the vehicle.

5. The display system of claim 1, wherein the seat position sensor device is adapted to determine the position of the driver seat along rails mounted within the vehicle and slidably connected the driver seat.

6. The display system of claim 5, wherein the seat position sensor device is adapted to determine the distance between a center of gravity of the driver seat and a plane defined by the rails.

7. The display system of claim 6, wherein the seat position sensor device is adapted to determine the angular position of the driver seat relative to a plane perpendicular to the plane defined by the rails.

8. The display system of claim 1, wherein the seat position sensor device is chosen among a video camera, pressure sensors, electromagnetic sensors, and/or ultrasonic sensors.

9. The display system of claim 1, wherein the system further comprises a memory storing reference data relative to a plurality of reference positions of the driver seat and wherein the controller is adapted to compare the seat position data received from the seat position sensor device with the reference data and to determine if the current position of the driver seat corresponds to a specific reference position.

10. The display system of claim 1, wherein the display orientating device is adapted to pivot each display unit around a fixed axis within the vehicle.

11. The display system of claim 1, wherein the orientations of the at least two display units relative to the driver seat are adjusted by the controller to provide to the occupant a field of vision that is in accordance with the Regulation UN ECE n°46.

12. A method for adjusting the orientation of at least two display units of a display system within a vehicle, the display system comprising:
at least two display units mounted within the vehicle so as to be positioned at both sides of the driver seat, the display units being adapted to display images captured by the video cameras mounted outside the vehicle, wherein the orientation of each display unit relative to the driver seat is adjustable;
a display orientating device adapted to control the orientation of each display unit within the vehicle;

a seat position sensor device adapted to sense in real time the position of the driver seat within the vehicle and to output corresponding seat position data; and a controller coupled to the display orientating device and to the seat position sensor device and adapted to automatically control the display orientating device based on the seat position data received from the seat position sensor device such that the orientations of the at least two display units relative to the driver seat are adjusted to permit an occupant seated in the driver seat to see both display units at the same viewing angle in any positions of the driver seat;

wherein the method comprises:

determining a current position of the driver seat within the vehicle;

providing the current position to the controller;

determining the orientations of the at least two display units based on the current position, the determined orientations permitting an occupant seated in the driver seat to see both display units at the same viewing angle in any positions of the driver seat, the determining being performed automatically by the controller; and adjusting the orientations of the at least two display units to the determined orientations.

13. The method of claim 12, wherein the determining the current position of the driver seat is performed by a seat position sensor device coupled to the controller.

14. The method of claim 12, wherein the adjusting the orientations of the at least two display units is performed by a display orientating device coupled to the controller.

* * * * *